United States Patent
Yoo et al.

(12)

(10) Patent No.: US 6,222,801 B1
(45) Date of Patent: Apr. 24, 2001

(54) OPTICAL PICKUP USING OPTICALLY VARIABLE IRIS

(75) Inventors: Jang-Hoon Yoo; Pyong-Yong Seong, both of Seoul; Yong-Jae Lee, Suwon; Tae-Kyung Kim, Suwon; Yong-Ki Son, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/266,862

(22) Filed: Mar. 12, 1999

(30) Foreign Application Priority Data

Mar. 12, 1998 (KR) .................................................. 98-8372

(51) Int. Cl.[7] ........................................................ G11B 7/12
(52) U.S. Cl. ................................. 369/44.23; 369/44-140; 369/112; 369/118
(58) Field of Search ........................... 369/44.23, 44.11, 369/44.14, 112, 110, 111, 109, 94, 118, 44.37, 103

(56) References Cited

U.S. PATENT DOCUMENTS 5,734,637 * 3/1998 Ootaki et al. ..................... 369/118 X
5,737,294 * 4/1998 Yamakawa et al. ............ 369/44.23 X
5,844,879 * 12/1998 Morita et al. ..................... 369/112 X

* cited by examiner

*Primary Examiner*—Muhammad Edun
(74) *Attorney, Agent, or Firm*—Staas & Halsey LLP

(57) ABSTRACT

An optical pickup includes a variable iris having a numerical aperture is adjusted according to wavelength of light and can be compatibly used for discs having respectively different specifications. The optical pickup includes a plurality of laser sources respectively emitting light of different wavelengths, an objective lens for focusing the light emitted from the laser sources into an optical spot optimized to each information recording surface of the plurality of discs, at least one photo detector for detecting the light reflected from the information recording surfaces of the corresponding discs where the optical spot is focused and passed through the objective lens, an optical element for adjusting an optical path so that the light emitted from the laser sources is directed toward the objective lens and the light emitted from the objective lens is directed toward the at least one photo detector, and a variable iris coupled between the laser sources and the objective lens, selectively operating according to the wavelength. The optical pickup can be compatibly used for discs having respectively different specifications irrespective of the thicknesses of the discs. The variable iris selectively operates in the case that light of two or more wavelengths is used, to thereby provide an effect of accomplishing an optimal optical spot on the discs.

20 Claims, 6 Drawing Sheets

RADIAL DIRECTION
TANGENTIAL DIRECTION
INNER AREA
VARIABLE IRIS SURFACE (OUTER AREA)
30  31  32  33

OPTICAL THIN FILM B
OPTICAL THIN FILM A

OPTICAL PICKUP USING OPTICALLY VARIABLE IRIS

CROSS-REFERENCE TO RELATED APPLICATIONS

This application claims the benefit of Korean Application No. 98-8372, filed Mar. 12, 1998, in the Korean Patent Office, the disclosure of which is incorporated herein by reference.

BACKGROUND OF THE INVENTION

1. Field of the Invention

The present invention relates to an optical pickup compatible with optical recording media having respectively different specifications.

2. Description of the Related Art

There are discs, cards or tapes, etc., used as recording media for recording and reproducing information such as video, audio or data at high density. Among them, discs are widely being used. In the structure of one type of disc, a plastic or glass medium having a certain thickness exists along an axial direction through which light is incident, and an information recording surface exists on the medium. Recently, the optical disc field has been developed from a laser disc (LD) and a compact disc (CD) to a digital video disc (DVD).

At present, a high density optical disc system uses an objective lens having a large numerical aperture (NA) and a light source of short wavelength light of 635 nm or 650 nm, in order to enhance a recording density. The use of the short wavelength light source enables reproduction of data from a CD having a different thickness from that of a DVD, as well as recording and reproduction of information on/from the DVD. However, the system should use light of 780 nm wavelength in order to be compatible with a writable compact disc (CD-R) which is a recent type of CD. This is due to a recording characteristic of the CD-R recording medium. Thus, it has been crucial to develop an optical pickup which can use light of both 780 nm and 650 nm wavelengths, in order to compatibly use both a DVD and a CD-R. As a disc specification changes, an optical aberration occurs due to a change in disc thickness, a change of wavelength and a change of a numerical aperture. Accordingly, a search for an optical pickup compatible with different specifications while removing the optical aberration is actively being pursued. As a result of the search, optical pickups compatible with different specifications are being manufactured. An existing optical pickup compatible with a DVD and a CD-R will be described below with reference to FIG. 1.

FIG. 1 shows an existing optical pickup using a conventional variable iris. The optical pickup of FIG. 1 uses laser light of 635 nm wavelength during reproduction of a DVD and uses laser light of 780 nm wavelength during recording and reproduction of a CD-R. The light of 635 nm wavelength emitted from a light source 1 which is a laser diode is incident to a collimating lens 2. The light beams of 635 nm wavelength are shown as solid lines. The collimating lens 2 converts the incident light into parallel light. The light having passed through the collimating lens 2 is reflected by a polarizing beam splitter 3 and then proceeds to an interference filter prism 4.

Meanwhile, the light of 780 nm wavelength emitted from a light source 11 being a laser diode passes through a collimating lens 12, a beam splitter 13, and a focusing lens 14 and then proceeds to the interference filter prism 4. The light beams of 780 nm wavelength are shown as dotted lines. The interference filter prism 4 totally transmits the light of 635 nm wavelength reflected from the polarizing beam splitter 3 and totally reflects the light of 780 nm wavelength focused by the focusing lens 14. As a result, the light emitted from the light source 1 is incident to a wavelength plate 5 in the form of the parallel light made by the collimating lens 2. The light emitted from the light source 11 is incident to the wavelength plate 5 in the form of diverging light. The light transmitting through the wavelength plate 5 passes through a thin-film type variable iris 6 and then is incident to an objective lens 7.

The objective lens 7 is designed to focus the light of 635 nm wavelength on an information recording surface of a DVD 8 having a thickness of 0.6 mm. The light of 635 nm wavelength having passed through the variable iris 6 is focused on the information recording surface of the DVD 8. As a result, the light reflected from the information recording surface of the DVD 8 contains the information recorded on the information recording surface. The reflected light is transmitted back through the objective lens 7, the thin-film type variable iris 6, the wavelength plate 5, the interference filter prism 4 and the polarizing beam splitter 3 and is detected by a photo detector 10.

Also, the objective lens 7 focuses the light of 780 nm wavelength having passed through the variable iris 6 on the information recording surface of the CD-R 9 having a thickness of 1.2 mm. In this case, a spherical aberration occurs due to the difference of thickness between the DVD 8 and the CD-R 9. The spherical aberration is due to the fact that the information recording surface of the CD-R 9 is located at a farther place from the objective lens 7 along its optical axis than that of the DVD 8. When the variable iris 6 to be described later referring to FIG. 2 is used, the light of 780 nm wavelength forms an optical spot of a size optimized to the CD-R 9 on the information recording surface of the CD-R 9. The light of 780 nm wavelength reflected from the CD-R 9 is transmitted back through the objective lens 7, the thin-film type variable iris 6 and the wavelength plate 5, is reflected by the interference filter prism, transmitted through the focusing lens 14, reflected by the beam splitter 13 and detected by a photo detector 15.

As shown in FIG. 2, the variable iris 6 of FIG. 1 has a thin film type structure which can selectively transmit the light incident to the area of not more than NA 0.6 corresponding to the diameter of the objective lens 7. That is, the variable iris 6 includes a first area where the light of both 635 nm and 780 nm wavelengths are transmitted and a second area where the light of 635 nm wavelength is totally transmitted and the light of 780 nm wavelength is totally reflected. The first area is an area having a numerical aperture not more than 0.45 and the second area is an outer area of the first area. Also, the first area is formed of a quartz ($SiO_2$) thin film in order to remove the optical aberration due to the second area formed of a dielectric thin film. By using the variable iris 6, the light of 780 nm wavelength passing through the first area of not more than NA 0.45 forms the optical spot appropriate for the CD-R 9 on the information recording surface thereof. As a result, the optical pickup of FIG. 1 is compatibly used with the optimized optical spot even when the optical recording medium is changed from the DVD 8 to the CD-R 9.

However, the optical pickup of FIG. 1 forms a finite optical system with respect to the light of 780 nm wavelength in order to remove the spherical aberration occurring when exchanging the DVD with the CD-R. For this reason, the structure of the optical system is complicated and the assembly of the optical components is difficult. In addition, since an optical path difference occurs between the light passing through the first area of not more than NA 0.45 and the second area of not less than NA 0.45, due to the dielectric thin film formed in the second area of not less than NA 0.45 of the variable iris 6, the first area needs to be formed of a special optical thin film ($SiO_2$ thin film). Accordingly, the first area has been formed of an $SiO_2$ thin film and the second area has been formed of a multi-layer thin film. However, since the manufacturing process is complicated and the adjustment of the thin film thickness should be done at high precision in units of "μm", it is not ideal for mass production. Also, although some techniques, in which the wavelengths of the light to be used are varied and a single lens is used, have been known in the direct overwrite technique for performing recording and reproduction operations simultaneously, such techniques cannot perform recording and reproduction operations with respect to different discs having different specifications.

SUMMARY OF THE INVENTION

To solve the above problems, it is an object of the present invention to provide an optical pickup using an optically variable iris which can be compatibly used for different discs having different specifications, in which the variable iris which enables use of light sources of different wavelengths is used to thereby remove a spherical aberration.

Additional objects and advantages of the invention will be set forth in part in the description which follows and, in part, will be obvious from the description, or may be learned by practice of the invention.

To accomplish the above and other objects of the present invention, there is provided an optical pickup including a plurality of laser sources to selectively operate depending upon which one of the optical recording media is to be accessed, the plurality of laser sources respectively emitting light of different wavelengths (a relatively shorter wavelength and a relatively longer wavelength) on corresponding ones of the optical recording media of different types; an objective lens for focusing the light emitted from the laser sources into an optical spot optimized to the information recording surfaces of the plurality of optical recording media; at least one photo detector for detecting the light reflected from the information recording surface of the optical recording medium where the optical spots are focused and passed through the objective lens; an optical element for adjusting optical paths so that the light emitted from the laser sources are directed toward the objective lens and the light reflected from the information recording surface of the plurality of optical recording media and emitted from the objective lens are directed toward the at least one photo detector; and a variable iris coupled between the laser sources and the objective lens, selectively operating according to the wavelengths of the light, wherein the variable iris totally transmits light with respect to a first one of the laser sources having a relatively shorter wavelength, operates to transmit light with a smaller numerical aperture with respect to a second one of the laser sources having a relatively longer wavelength and the numerical aperture in a radial direction of a disc is set smaller than in a tangential direction of the disc for stability of a track signal.

BRIEF DESCRIPTION OF THE DRAWINGS

The above and other objects and advantages of the present invention will become more apparent by describing the preferred embodiment thereof in more detail with reference to the accompanying drawings, in which.

DESCRIPTION OF THE PREFERRED EMBODIMENTS

Figure 1:
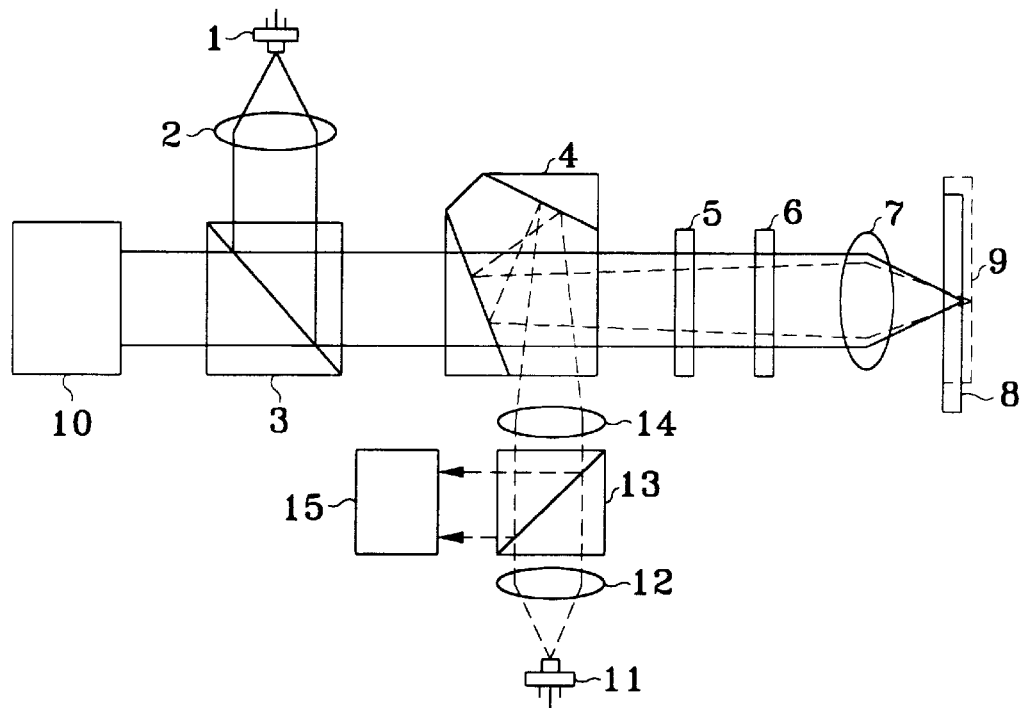
FIG. 1 shows an existing optical pickup using a conventional variable iris.
Figure 2:
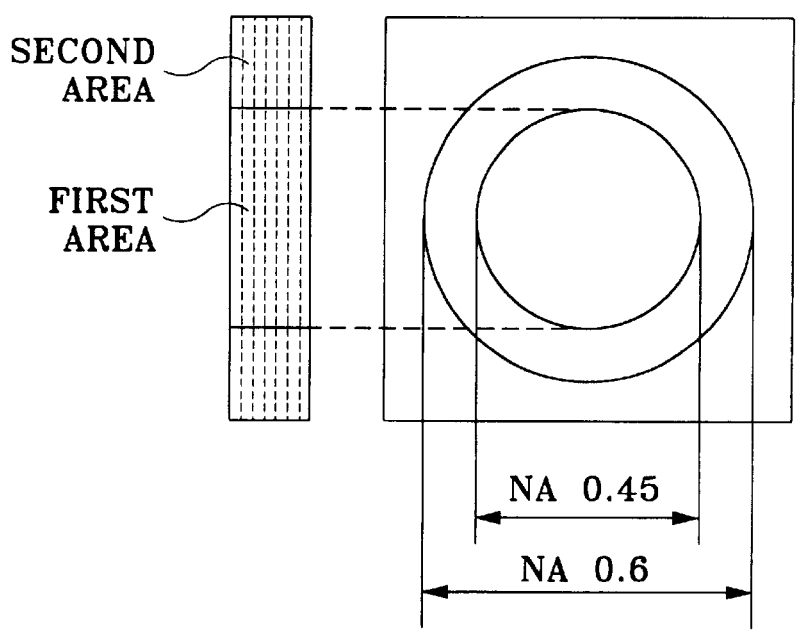
FIG. 2 is a view for explaining the variable iris shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
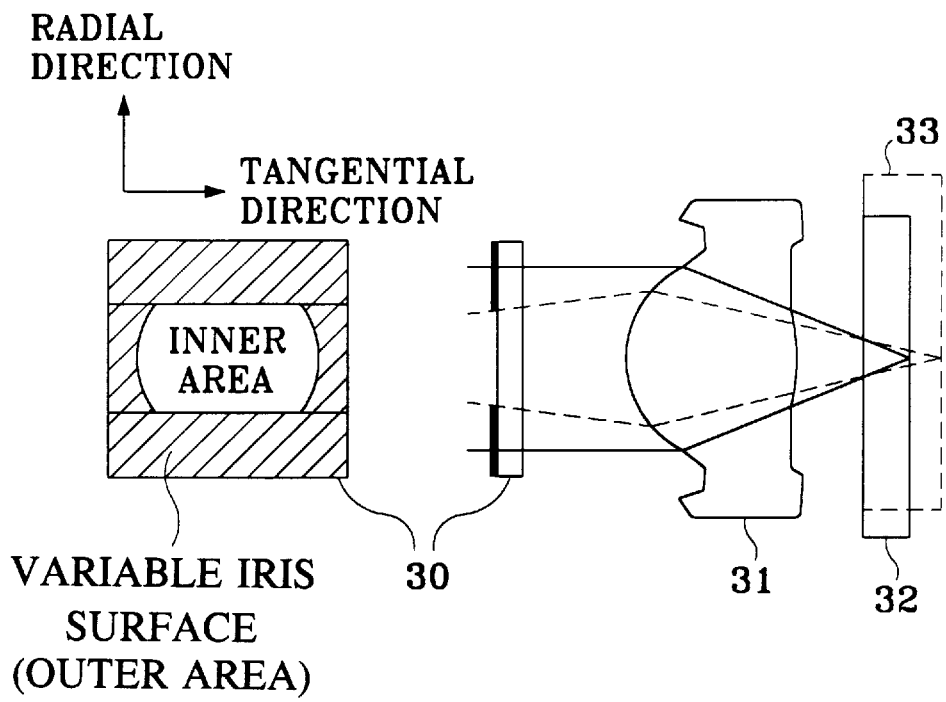
FIG. 3 shows an optical pickup having a variable iris used in the present invention.

Referring to FIG. 3 showing an optical pickup having a variable iris 30 used in the present invention, the variable iris 30 includes an inner area and an outer area. The outer area is formed of a variable iris surface which is shaded in the drawing. The inner area of the variable iris 30 has a shape of a straight line in a tangential direction and that of a curved line in a radial direction of a disc which is to be accessed. The tangential direction means a direction perpendicular to the plane of the disc which is to be accessed. It is possible for the inner area to have a rectangular shape or an elliptical shape. The variable iris 30 adjusts the numerical aperture (NA) according to wavelengths of incident light in the case that the wavelengths of the incident light are different from each other. That is, the variable iris 30 of FIG. 3 transmits the light of 635 nm wavelength without being affected by a variable iris surface, and transmits the light of 780 nm wavelength toward the inner area, but not toward the variable iris surface. In particular, when the light of 780 nm wavelength is used, a different numerical aperture is provided with respect to the radial direction and the tangential direction of the disc. Thus, an optical spot can be optimized. An optical pickup having the variable iris 30 improves the jitter characteristic of a playback signal and has an optical characteristic tolerant with respect to disc polarization and offset.

Figure 4A:
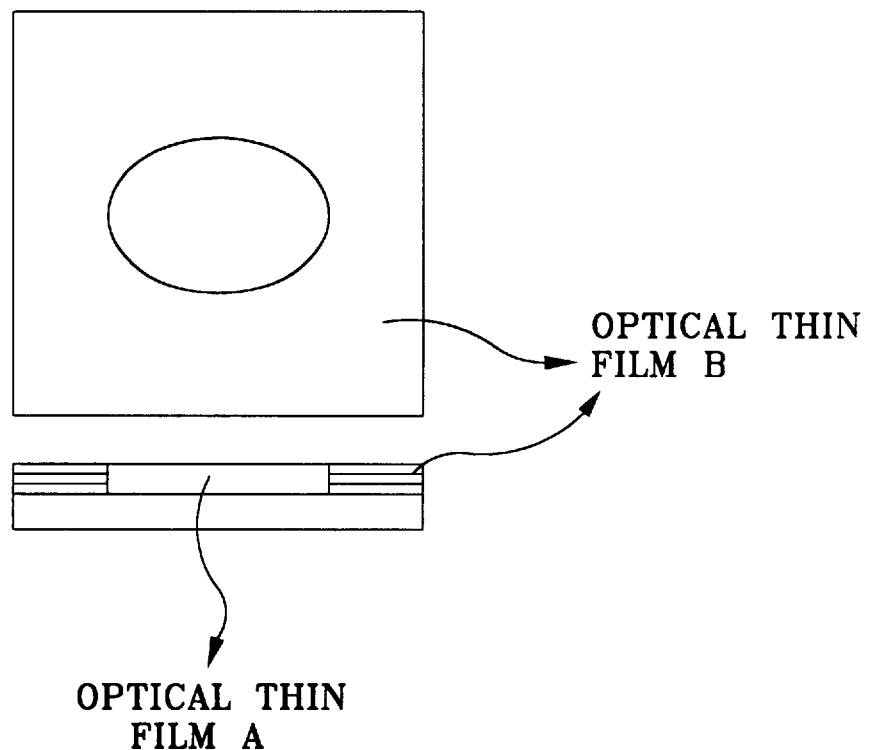
FIG. 4A shows a coated elliptical variable iris according to a first aspect of the present invention.

FIG. 4A shows a coated elliptical variable iris according to a first aspect of the present invention. The variable iris shown in FIG. 4A is obtained by coating the variable iris surface shown in FIG. 3, in which the inner area and the variable iris surface are coated with optical thin films of respectively different materials. Thus, in the coated elliptical variable iris shown in FIG. 4A, the inner area is coated with an optical thin film A and the variable iris surface is coated with an optical thin film B. The optical thin film A and the optical thin film B selectively transmit light according to wavelength. Thus, the variable iris shown in FIG. 4A has the same characteristic as that of the variable iris 30 shown in FIG. 3. That is, the variable iris of FIG. 4A transmits the light of 635 nm wavelength without being affected by the optical thin film-coated variable iris surface, and transmits the light of 780 nm wavelength toward the inner area, not toward the variable iris surface. In the case that the inner area of the variable iris is elliptical, the long and short axis rates of an ellipse are 0.5<e=b/a<0.93. Here, a is a radius of the long axis and b is a radius of the short axis.

Figure 4B:
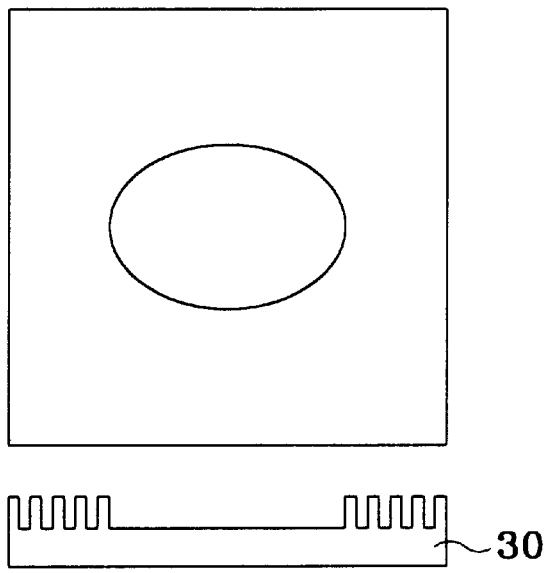
FIG. 4B shows a hologram type variable iris according to a second aspect of the present invention.

FIG. 4B shows a hologram type variable iris according to a second aspect of the present invention. That is, FIG. 4B shows the shape of the variable iris using a hologram. The hologram type variable iris is obtained by holographically processing the variable iris surface of the variable iris 30 shown in FIG. 3. Thus, the hologram type variable iris shown in FIG. 4B has the same characteristic as that of the variable iris 30 shown in FIG. 3. That is, the variable iris shown in FIG. 4B transmits the light of 635 nm wavelength without being affected by the hologram-processed variable iris surface, and transmits the light of 780 nm wavelength toward the inner area, not toward the variable iris surface.

Figure 4C:
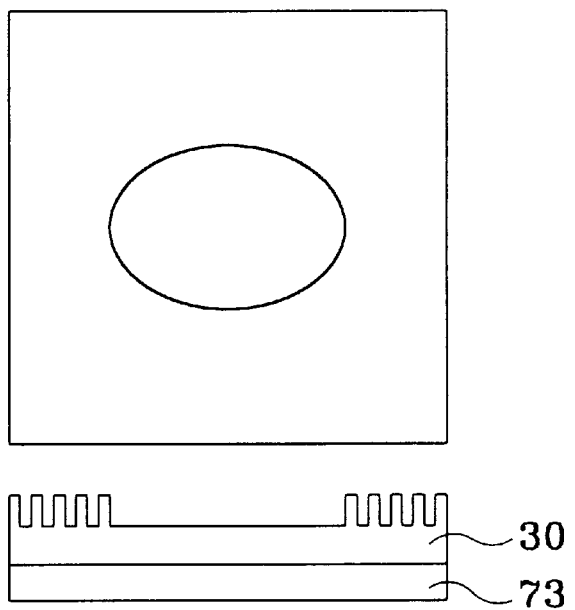
FIG. 4C shows that the variable iris of FIG. 4B is integrally coupled with a wavelength plate.

It is possible to couple the variable iris of FIGS. 4A or 4B with a wavelength plate. FIG. 4C shows that the hologram type variable iris of FIG. 4B is integrally coupled with a wavelength plate 73. The reason why that the hologram type variable iris is integrally coupled with the wavelength plate 73 is for enhancing an optical efficiency thereof.

Figure 5:
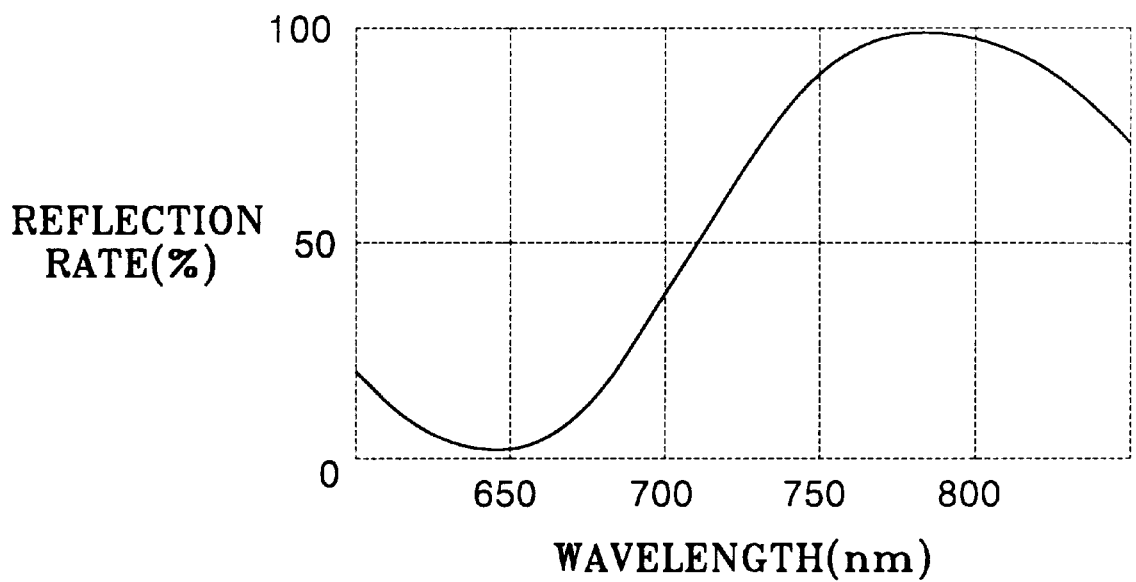
FIG. 5 shows an optical reflection rate according to wavelength in the variable iris surface of the variable iris according to the present invention.

FIG. 5 shows an optical reflection rate according to wavelength in the variable iris surface of the variable iris according to the present invention, in which an optical reflection characteristic of the variable iris surface for selectively operating according to wavelength is illustrated. That is, the variable iris surface according to the present invention has the characteristic that the light of the short wavelength (~635 nm) is totally transmitted and the light of the long wavelength (~780 nm) is totally reflected and not transmitted.

In the above-described aspects, the inner area of the variable iris is elliptical, but can be rectangular instead to perform the same function.

Figure 6:
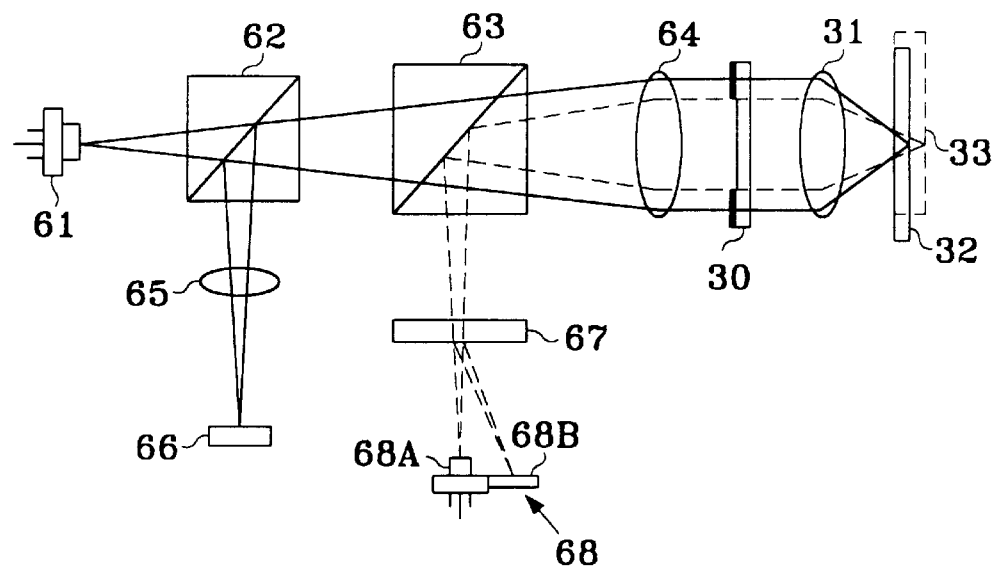
FIG. 6 shows an optical pickup having a variable iris according to a first embodiment of the present invention.

An embodiment of the optical pickup having the variable iris of the present invention will be described below referring to FIG. 6. The optical pickup of FIG. 6 is an optical pickup in which the light emitted from laser sources 61 and 68A is focused on two discs 32 and 33, respectively, and the light reflected from the discs 32 and 33 are detected in photo detectors 66 and 68B, respectively. The optical pickup shown in FIG. 6 also includes a variable iris 30 according to the present invention between a collimating lens 64 and an objective lens 31. Here, the laser source 68A and the photo detector 68B form a single unit 68.

The operation of the optical pickup shown in FIG. 6 will be described with respect to the DVD 32 being a thin disc and the CD-R 33 being a thick disc.

In the optical pickup shown in FIG. 6, during reproduction of information with respect to the DVD 32, laser light of 635 nm wavelength emitted from the laser source 61 transmits through a beam splitter 62 and is incident to a beam splitter 63. This laser light is shown as solid lines. The light transmitted through the beam splitter 63 is converted into parallel light by the collimating lens 64. The light transmitted through the collimating lens 64 passes through the variable iris 30 and forms an optical spot on an information recording surface of the DVD 32 after being focused by the objective lens 31. The light reflected from the information recording surface of the DVD 32 passes through the objective lens 31, the variable iris 30, the collimating lens 64, and the beam splitter 63, and then is incident to the beam splitter 62. The beam splitter 62 reflects the incident light. The reflected light is focused on the photo detector 66 by a light receiving lens 65. In this way, during the operation of reproducing information with respect to the DVD 32, the light incident to the variable iris 30 is transmitted without being affected by the variable iris surface.

Meanwhile, during reproduction of information with respect to the CD-R 33, laser light of 780 nm wavelength emitted from the laser source 68A is incident to a hologram type beam splitter 67. This laser light is shown as dotted lines. The incident light transmits through the hologram type beam splitter 67 and proceeds to the beam splitter 63. This light is reflected by the beam splitter 63 and converted into parallel light by the collimating lens 64. The light transmitted through the collimating lens 64 passes through the variable iris 30 and forms an optical spot on the information recording surface of the CD-R 33 after being focused by the objective lens 31. As described above, during reproduction of information with respect to the CD-R 33, the light incident to the variable iris 30 is transmitted through the inner area. In the optical pickup shown in FIG. 6, a total conjugate length from the laser source 68A to the CD-R 33 is set shorter than that from the laser source 61 to the DVD 32, to thereby correct a spherical aberration. As the spherical aberration is corrected in this way, the size of the spot can be reduced up to 1.2 μm. However, in the case that the disc is slanted, the optical characteristic deteriorates and reproduction of the disc becomes difficult. Therefore, the variable iris 30 according to the present invention is used between the laser sources and the objective lens 31. As a result, the optical spot size becomes 1.4 μm, to thereby accomplish the optimal condition of the disc reproduction.

The variable iris 30 reduces the numerical aperture in a radial direction of the discs to be accessed and enlarges the spot size, and enlarges the numerical aperture in the tangential direction of the discs to be accessed and reduces the spot size. Thus, the variable iris 30 shown in FIG. 6 reduces the spot size only in the tangential direction of the disc to improve the jitter value. Also, stable reproduction of the track signal becomes possible.

Figure 7A:
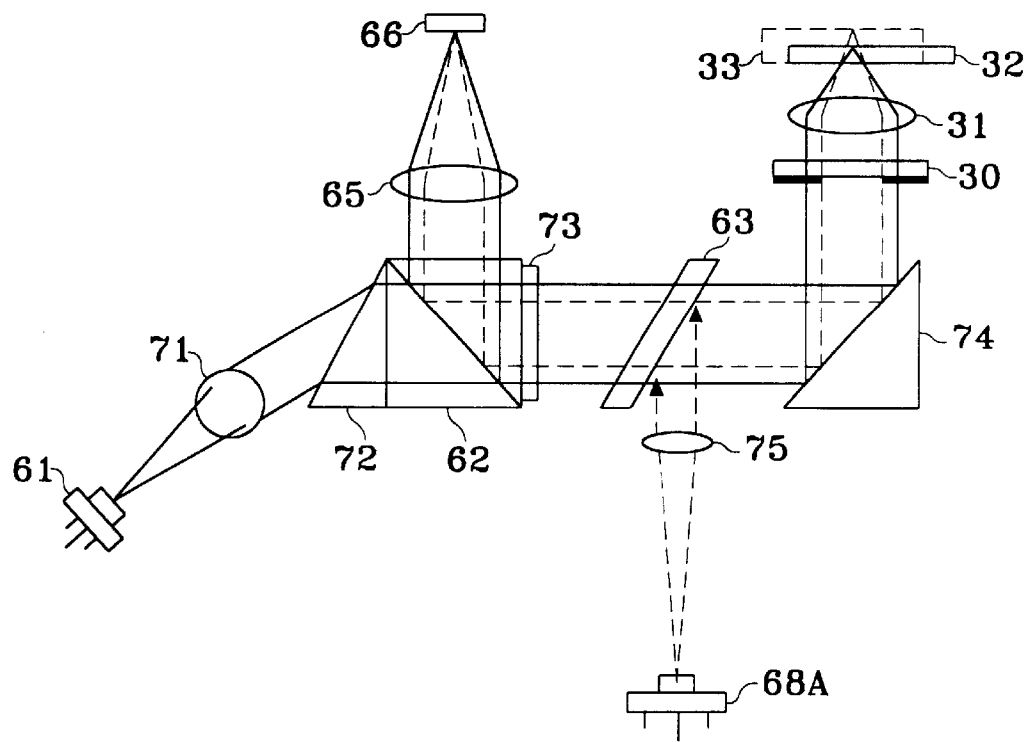
FIG. 7A shows an optical pickup having a variable iris according to a second embodiment of the present invention.

FIG. 7A shows an optical pickup having a variable iris according to a second embodiment of the present invention. The optical pickup of FIG. 7A further includes collimating lenses 71 and 75, a prism 72, a wavelength plate 73 and a reflective prism 74, in addition to the structure of the optical pickup shown in FIG. 6. Here, since an optical astigmatism is apt to occur in the case that the wavelength plate 73 is attached to the beam splitter 62, the beam splitter 62 is disposed between the prism 72 and the wavelength plate 73. Among the components shown in FIG. 7A, the components having the same reference numerals as those shown in FIG. 6 perform the same functions as those shown in FIG. 6.

In FIG. 7A, during reproduction of the DVD 32, the light emitted from the laser source 61 is transmitted through the collimating lens 71, the prism 72 and the beam splitters 62 and 63 and is reflected by the reflective prism 74. The reflective prism 74 reflects the parallel light emitted from the beam splitter 63 toward the variable iris 30 and the objective lens 31, and forms an optical spot on the information recording surface of the DVD 32 by the objective lens 31. This light is shown as solid lines. The light reflected from the DVD 32 returns to the reflective prism 74 and the beam splitter 63, the wavelength plate 73, the beam splitter 62, the light receiving lens 65 and is detected by the photo detector 66. Meanwhile, during reproduction of information with respect to the CD-R 33, the light emitted from the laser source 68A is incident to the beam splitter 63 through the collimating lens 75 and is reflected by the reflective prism 74. The reflected light passes through the variable iris 30 and the objective lens 31 and forms an optical spot on the information recording surface of the CD-R 33. The light reflected from the information recording surface of the CD-R 33 is transmitted through the objective lens and variable iris 30, reflected by the reflective prism 74, transmitted by the beam splitter 63 and the wavelength plate 73, reflected by the beam splitter 52, transmitted by the light receiving lens 65 and detected by the photo detector 66.

Figure 7B:
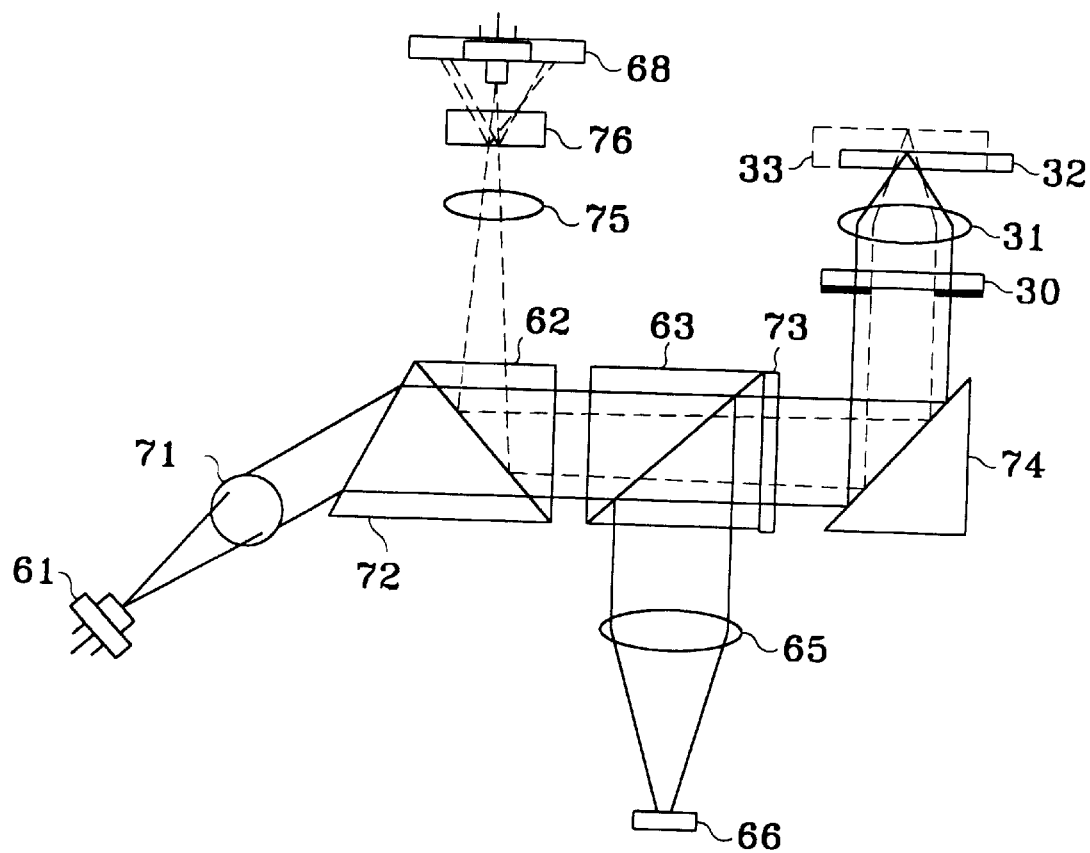
FIG. 7B shows an optical pickup having a variable iris according to a third embodiment of the present invention.

Meanwhile, FIG. 7B shows an optical pickup having a variable iris according to a third embodiment of the present invention. The FIG. 7B optical system further includes a hologram type beam splitter 76 between the collimating lens 75 and the single unit 68. Since the optical pickup using the hologram type beam splitter 76 can well be appreciated by one skilled in the art in view of the pickup shown in FIG. 7A, a detailed description thereof will be omitted.

As described above, the optical pickup according to the present invention can be compatibly used for discs having respectively different specifications irrespective of the thickness of the discs. The variable iris selectively operates in the case that light of two or more wavelengths is used, to thereby provide an effect of accomplishing an optimal optical spot on information recording surfaces of the discs having different specifications.

What is claimed is:

1. An optical pickup compatible with a plurality of types of optical recording media having information recording surfaces, the optical pickup comprising:
    a plurality of laser sources to selectively operate depending upon which one of the optical recording media is to be accessed, the plurality of laser sources respectively emitting light of different wavelengths on corresponding ones of the optical recording media;
    an objective lens to focus the light emitted from the laser sources into optical spots optimized to the information recording surfaces of the corresponding ones of the optical recording media;
    at least one photo detector to detect the light reflected from the information recording surfaces of the optical recording media where the optical spots are focused and passed through the objective lens;
    an optical element to adjust optical paths so that the light emitted from the laser sources are directed toward the objective lens and the light emitted from the objective lens are directed to the at least one photo detector; and
    a variable iris formed between the laser sources and the objective lens, selectively operating according to the wavelengths of the light emitted from the plurality of laser sources;
    wherein said variable iris totally transmits light with respect to a first one of the laser sources having a relatively shorter wavelength, operates to transmit light with a smaller numerical aperture with respect to a second one of the laser sources having a relatively longer wavelength, and the numerical aperture in a radial direction of the optical recording media to be accessed is set smaller than in a tangential direction of the optical recording media to be accessed for stability of a track signal.

2. The optical pickup according to claim 1, further comprising a wavelength plate integrally coupled with the variable iris.

3. The optical pickup according to claim 1, wherein said variable iris comprises a variable iris surface formed of an optical thin film, in order to have a variable numerical aperture according to the one of the plurality of laser sources in use.

4. The optical pickup according to claim 3, wherein said variable iris comprises an elliptical inner area, to have respectively different numerical apertures with respect to the radial and tangential directions of the optical recording media.

5. The optical pickup according to claim 4, wherein long and short axis rates (e) of an ellipse formed by the elliptical inner area are 0.5<e=b/a<0.93;
    wherein a is a radius of the long axis and b is a radius of the short axis.

6. The optical pickup according to claim 3, wherein said variable iris comprises a rectangular inner area, to have respectively different numerical apertures with respect to the radial and tangential directions of the optical recording media.

7. The optical pickup according to claim 1, wherein said variable iris comprises a variable iris surface of a hologram type, in order to have a variable numerical aperture according to the one of the plurality of laser sources in use.

8. The optical pickup according to claim 7, wherein said variable iris comprises an elliptical inner area, to have respectively different numerical apertures with respect to the radial and tangential directions of the optical recording media.

9. The optical pickup according to claim 8, wherein long and short axis rates (e) of an ellipse formed by the elliptical inner area are 0.5<e=b/a<0.93;
    wherein a is a radius of the long axis and b is a radius of the short axis.

10. The optical pickup according to claim 7, wherein said variable iris comprises a rectangular inner area, to have respectively different numerical apertures with respect to the radial and tangential directions of the optical recording media.

11. The optical pickup according to claim 1, wherein the types of optical recording media include a compact disc (CD) and a digital video disc (DVD) and the first one of the laser sources emits the light of approximately 635 nm when the DVD is to be accessed and the second one of the laser sources emits the light of approximately 780 nm when the CD is to be accessed.

12. The optical pickup according to claim 1, wherein said variable iris comprises:
    an inner area having a first dimension in a radial direction of the optical recording media less than a second dimension in a tangential direction of the optical recording media, wherein the inner area transmits the light of both the first and second laser sources; and
    an outer area which surrounds the inner area and transmits only the light of the first laser source.

13. The optical pickup according to claim 1, wherein said variable iris has a numerical aperture in a radial direction of the optical recording media which is different from a numerical aperture in a tangential direction of the optical recording media.

14. The optical pickup according to claim 1, wherein the inner area and outer areas are coated with optical thin films of respectively different materials.

15. The optical pickup according to claim 1, wherein the outer area is holographically processed.

16. The optical pickup according to claim 1, wherein a first optical length from the first laser source to the corresponding one of the optical recording media of a first type is set longer than a second optical length from the second laser source to the corresponding one of the optical recording media of a second type.

17. The optical pickup according to claim 1, further comprising:
a collimating lens; and
a light receiving lens;
wherein
the at least one photo detector comprises first and second photo detectors to respectively receive the light emitted from the first and second laser sources and reflected from the corresponding ones of the optical recording media of first and second types;
the optical element comprises
a first beam splitter formed in a linear path between the first laser source and the objective lens, to transmit the light emitted from the first laser source and reflect the light emitted from the first laser source and reflected from the optical recording medium of the first type,
a second beam splitter formed in the linear path between the first beam splitter and the objective lens, to transmit the light emitted from the first light source and the light emitted from the first light source and reflected from the optical recording medium of the first type, and to reflect the light emitted from the second light source and the light emitted from the second light source and reflected from the optical recording medium of the second type, and
a third beam splitter formed between the second beam splitter and the second photo detector, to transmit the light emitted from the second laser source and direct the light emitted from the second laser source and reflected from the optical recording medium of the second type to the second photo detector;
wherein the light receiving lens is between the first beam splitter and the first photodetector, the collimating lens is between the second beam splitter and the variable iris, and the variable iris is between the collimating lens and the objective lens.

18. The optical pickup according to claim 1, further comprising:
first and second collimating lenses; and
a light receiving lens;
wherein
the at least one photo detector comprises a photo detector to receive the light emitted from the first and second laser sources and reflected from the corresponding ones of the optical recording media of first and second types;
the optical element comprises
a first prism formed in a light path between the first laser source and the objective lens, to bend the light emitted from the first laser source,
a first beam splitter to transmit the light emitted from the first light source and bent by the first prism, and to reflect the light emitted from the first and second light sources and reflected from the optical recording media of the first and second types, respectively,
a second beam splitter formed in the light path between the first beam splitter and the objective lens, to transmit the light emitted from the first laser source and the light emitted from the first and second laser sources and reflected by the optical recording media of the first and second types, respectively, and to reflect the light emitted from the second laser source, and
a reflective prism formed in the light path between the second beam splitter and the objective lens, to reflect the light emitted by the first and second laser sources and the light emitted by the first and second laser sources and reflected by the optical recording media of the first and second types, respectively;
wherein the light receiving lens is between the first beam splitter and the photo detector to direct the light reflected from the optical recording media of the first and second types to the photo detector, the first collimating lens is between the first laser source and the first prism, the second collimating lens is between the second laser source and the second beam splitter, and the variable iris is between the reflective prism and the objective lens.

19. The optical pickup according to claim 18, further comprising a wavelength plate formed adjacent to the first beam splitter and between the first and second beam splitters.

20. The optical pickup according to claim 1, further comprising:
first and second collimating lenses;
a holographic beam splitter; and
a light receiving lens;
wherein
the at least one photo detector comprises first and second photo detectors to receive the light emitted from the first and second laser sources and reflected from the corresponding ones of the optical recording media of first and second types, respectively;
the optical element comprises
a first prism formed in a light path between the first laser source and the objective lens, to bend the light emitted from the first laser source,
a first beam splitter to transmit the light emitted from the first light source and bent by the first prism, and to reflect the light emitted from the second light source and reflected from the optical recording medium of the second type,
a second beam splitter formed in the light path between the first beam splitter and the objective lens, to transmit the light emitted from the first laser source and the light emitted from the second laser source and the light emitted from the second laser source and reflected by the optical recording medium of the second type, and to reflect the light emitted from the first laser source and reflected by the optical recording medium of the first type to the first photo detector, and
a reflective prism formed in the light path between the second beam splitter and the objective lens, to reflect the light emitted by the first and second laser sources and the light emitted by the first and second laser sources and reflected by the optical recording media of the first and second types, respectively;
wherein the light receiving lens is between the second beam splitter and the first photo detector to direct the light reflected from the optical recording medium of the first type to the first photo detector, the first collimating lens is between the first laser source and the first prism, the second collimating lens is between the second beam splitter and the holographic beam splitter, and the variable iris is between the reflective prism and the objective lens.

* * * * *